(12) United States Patent
Hwang et al.

(10) Patent No.: US 10,451,152 B2
(45) Date of Patent: Oct. 22, 2019

(54) POWER TRANSMISSION APPARATUS FOR VEHICLE

(71) Applicants: HYUNDAI MOTOR COMPANY, Seoul (KR); KIA Motors Corporation, Seoul (KR)

(72) Inventors: Seong Wook Hwang, Gunpo-si (KR); Hyun Sik Kwon, Seoul (KR); Ki Tae Kim, Incheon (KR); Wonmin Cho, Hwaseong-si (KR); Kijong Park, Hwaseong-si (KR); Seongwook Ji, Gunpo-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 48 days.

(21) Appl. No.: 15/827,577

(22) Filed: Nov. 30, 2017

(65) Prior Publication Data

US 2019/0120342 A1 Apr. 25, 2019

(30) Foreign Application Priority Data

Oct. 19, 2017 (KR) .......................... 10-2017-0135815

(51) Int. Cl.
*F16H 3/78* (2006.01)
*F16H 3/00* (2006.01)
(Continued)

(52) U.S. Cl.
CPC ............... *F16H 3/78* (2013.01); *F16H 3/006* (2013.01); *F16H 2200/006* (2013.01); *F16H 2200/2041* (2013.01); *F16H 2306/48* (2013.01)

(58) Field of Classification Search
CPC . F16H 3/78; F16H 3/006; F16H 3/093; F16H 2003/0935; F16H 2003/0936;
(Continued)

(56) References Cited

U.S. PATENT DOCUMENTS 3,274,858 A * 9/1966 Jensen .................... F16H 3/663
475/129
4,132,133 A * 1/1979 Ballendux ................ F16H 3/02
74/745

(Continued)

FOREIGN PATENT DOCUMENTS

EP 3121483 A1 7/2016

*Primary Examiner* — Tinh T Dang
(74) *Attorney, Agent, or Firm* — McDonnell Boehnen Hulbert & Berghoff LLP

(57) ABSTRACT

A power transmission apparatus for a vehicle includes a first input shaft selectively connected with an engine output shaft through a first clutch; a second input shaft selectively connected to the engine output shaft through a second clutch; a third input shaft selectively connected to the engine output shaft through a third clutch; a power transmission shaft disposed about the external circumference of the second input shaft; first and second center shafts selectively connected with each other through a fourth clutch; an idle shaft disposed in parallel with the first input shaft; a fixed transmission for selectively shifting torque input to various shafts and outputting the torque through the second center shaft and the power transmission shaft; a composite transmission configured to complementarily composite shift and output input torque; and an output shaft outputting the torque transmitted from the composite transmission to a final reduction gear.

15 Claims, 9 Drawing Sheets

(51) Int. Cl.
*F16H 3/093* (2006.01)
*F16H 37/04* (2006.01)

(58) Field of Classification Search
CPC ....... F16H 2200/006; F16H 2200/2041; F16H 2306/48; F16H 37/042
See application file for complete search history.

(56) References Cited

U.S. PATENT DOCUMENTS

| | | | | |
|---|---|---|---|---|
| 7,575,529 | B2* | 8/2009 | Holmes | B60K 6/365 |
| | | | | 475/5 |
| 7,695,390 | B2* | 4/2010 | Phillips | F16H 37/0833 |
| | | | | 475/218 |
| 8,123,647 | B2* | 2/2012 | Wenthen | F16H 37/046 |
| | | | | 475/218 |
| 8,323,142 | B2 | 12/2012 | Masumoto | |
| 8,747,274 | B2* | 6/2014 | Phillips | F16H 3/78 |
| | | | | 475/207 |
| 8,801,566 | B2* | 8/2014 | Phillips | F16H 37/04 |
| | | | | 475/302 |
| 9,022,891 | B2* | 5/2015 | Phillips | F16H 3/78 |
| | | | | 475/218 |
| 9,145,960 | B2* | 9/2015 | Phillips | F16H 3/006 |
| 9,267,576 | B2* | 2/2016 | Beck | F16H 3/66 |
| 9,382,975 | B2* | 7/2016 | Robinette | F16H 3/093 |
| 10,272,764 | B2* | 4/2019 | Lee | B60K 6/365 |
| 2013/0031990 | A1 | 2/2013 | Singh et al. | |
| 2015/0018157 | A1* | 1/2015 | Beck | F16H 3/66 |
| | | | | 475/275 |
| 2018/0154757 | A1* | 6/2018 | Lee | B60K 6/365 |

* cited by examiner

FIG. 2

| Shift stage | CL1 | CL2 | CL3 | CL4 | SL1 D1 | SL1 N | SL1 D2 | SL2 P3 | SL2 N | SL2 P4 | Gear ratio |
|---|---|---|---|---|---|---|---|---|---|---|---|
| REV |  | ● |  | ● |  |  | ● |  | ● |  | -3.889 |
| FD1 | ● |  |  | ● |  | ● |  | ● |  |  | 4.366 |
| FD2 |  | ● |  | ● | ● |  |  |  | ● |  | 2.757 |
| FD3 | ● |  | ● | ● |  | ● |  |  |  | ● | 1.997 |
| FD4 |  |  | ● | ● |  | ● |  |  | ● |  | 1.577 |
| FD5 | ● |  | ● |  |  | ● |  |  |  | ● | 1.229 |
| FD6 |  | ● | ● |  | ● |  |  |  | ● |  | 1.000 |
| FD7 | ● |  | ● |  |  | ● |  | ● |  |  | 0.847 |
| FD8 |  | ● | ● |  |  |  | ● |  | ● |  | 0.545 |

● : Shift position

FIG. 4

| Shift stage | CL1 | CL2 | CL3 | CL4 | BK | SL1 | | | SL2 | | | Gear ratio |
|---|---|---|---|---|---|---|---|---|---|---|---|---|
| | | | | | | D1 | N | D2 | P3 | N | P4 | |
| REV | | ● | | ● | | | | ● | | ● | | -3.889 |
| FD1 | ● | | | ● | | | ● | | ● | | | | 4.366 |
| FD2 | | ● | | ● | | ● | | | | ● | | 2.757 |
| FD3 | ● | | ● | ● | | | ● | | | | ● | 1.997 |
| FD4 | ● | | ● | ● | | | ● | | | ● | | 1.577 |
| FD5 | | | ● | | | | ● | | | ● | ● | 1.229 |
| FD6 | | ● | ● | | | ● | | | | ● | | 1.000 |
| FD7 | | | ● | | | | ● | | ● | | | 0.847 |
| FD8 | | | ● | | ● | | ● | | | ● | | 0.671 |
| FD9 | | ● | ● | | | | | ● | | ● | | 0.545 |

● : Shift position

FIG. 7

| | Shift stage | CL1 | CL2 | CL3 | CL4 | BK | SL1 D1 | SL1 N | SL1 D2 | P3 | SL2 N | SL2 P4 | MG | Gear ratio |
|---|---|---|---|---|---|---|---|---|---|---|---|---|---|---|
| Engine mode / parallel mode | REV | | ● | | ● | | | ● | | | | | □ | -3.889 (reverse rotation) |
| | FD1 | ● | | | ● | | | ● | | ● | | | □ | 4.366 |
| | FD2 | | ● | | ● | | | ● | ● | | ● | | □ | 2.757 |
| | FD3 | ● | | ● | ● | | ● | | | | ● | | □ | 1.997 |
| | FD4 | | | ● | ● | | | ● | | | | ● | □ | 1.577 |
| | FD5 | ● | | ● | | | ● | | | | ● | | □ | 1.229 |
| | FD6 | | ● | ● | | | | ● | | | ● | | □ | 1.000 |
| | FD7 | ● | | ● | | | | ● | ● | ● | | | □ | 0.847 |
| | FD8 | | | ● | | ● | | ● | | | ● | | □ | 0.671 |
| | FD9 | | ● | ● | | | | | | | ● | ● | □ | 0.545 (reverse rotation) |
| e-CVT mode | FD | | | ● | | | | ● | | | ● | | □ | |
| EV mode | R | | | | ● | | | ● | | | ● | | ■ | (reverse rotation) |
| | FD | | | | ● | | | ● | | | ● | | ■ | |

● : Shift position    ■ : Drive only motor(EV)    □ : Drive motor torque assist

FIG. 9

| | Shift stage | ECL | CL1 | CL2 | CL3 | CL4 | BK | SL1 | | | SL2 | | | MG | Gear ratio |
|---|---|---|---|---|---|---|---|---|---|---|---|---|---|---|---|
| | | | | | | | | D1 | N | D2 | P3 | N | P4 | | |
| Engine mode / parallel mode | REV | ● | | ● | | ● | | | | ● | | | | □ (reverse rotation) | -3.889 |
| | FD1 | ● | ● | | | ● | | | ● | | ● | | | □ | 4.366 |
| | FD2 | ● | ● | ● | | ● | | ● | | | | ● | | □ | 2.757 |
| | FD3 | ● | ● | | | ● | | | ● | | | ● | ● | □ | 1.997 |
| | FD4 | ● | ● | | ● | | | | ● | | | ● | | □ | 1.577 |
| | FD5 | ● | ● | | ● | | | ● | | | | ● | ● | □ | 1.229 |
| | FD6 | ● | | | ● | | | | ● | | ● | | | □ | 1.000 |
| | FD7 | ● | | ● | ● | | | | ● | | | ● | | □ | 0.847 |
| | FD8 | ● | | | ● | | ● | | | ● | | ● | | □ | 0.671 |
| | FD9 | ● | | ● | | | | | | ● | | ● | | □ (reverse rotation) | 0.545 |
| EV mode | REV | | | ● | | ● | | | | | | | | ■ | |
| | FD1~FD9 | | | | | | | | | | | | | ■ | |

All shift stage EV mode traveling is possible
(operation element is the same as engine mode)

● : Shift position   ■ : Drive only motor(EV)   □ : Drive motor torque assist

POWER TRANSMISSION APPARATUS FOR VEHICLE

CROSS-REFERENCE TO RELATED APPLICATION

This application claims priority to and the benefit of Korean Patent Application No. 10-2017-0135815 filed in the Korean Intellectual Property Office on Oct. 19, 2017, the entire contents of which are incorporated herein by reference.

BACKGROUND OF THE DISCLOSURE

(a) Field of the Disclosure

The present disclosure relates to a power transmission apparatus for a vehicle. More particularly, the present disclosure relates to a power transmission apparatus for a vehicle in which a planetary gear set and one or more synchronizers are applied to a dual clutch transmission (DCT) to implement a multi-stage fixed shift stage and a motor/generator is additionally disposed to enable traveling in an electric vehicle mode and a parallel hybrid mode.

(b) Description of the Related Art

Environment-friendly technology in vehicles is a key technology relating to the survival of a future vehicle industry. Vehicle makers are dedicated to developing environment-friendly vehicles to meet environment and fuel consumption regulations.

Examples of the future type vehicle technology include an electric vehicle (EV) and a hybrid electric vehicle (HEV) that use electric energy, and a dual clutch transmission (DCT) that improves efficiency and convenience.

The DCT related to the present disclosure has two clutch devices in an automatic transmission and a gear train of a basic manual transmission, selectively transmits torque input from an engine to two input shafts using two clutches, and shifts and outputs the torque using the gear train.

Such a DCT is being attempted to compactly implement a high stage transmission of five or more stages and is implemented as an AMT (Auto Manual Transmission) that needs no manual transmission of a driver by controlling two clutches and synchronizing devices using a controller.

Accordingly, merits of the DCT that has excellent power delivery efficiency and is easy to change and add parts according to multi-stages compared to an automatic transmission of a planetary gear type may meet the importance of fuel consumption regulation and multi-stage efficiency, and thus the DCT is further spotlighted.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a power transmission apparatus for a vehicle having advantages of implementing a multi-stage fixed shift stage by applying a planetary gear set and one or more synchronizers to a dual clutch transmission (DCT), thereby simplifying an internal structure owing to a reduction in parts, improving fuel consumption by minimizing a weight, and improving mountability owing to a reduction in volume.

An exemplary embodiment of the present disclosure provides a power transmission apparatus for a vehicle having advantages of enabling traveling in an electric vehicle mode and a parallel hybrid mode by additionally disposing a motor/generator, thereby improving fuel consumption.

An exemplary embodiment of the present disclosure provides a power transmission apparatus for a vehicle including: a first input shaft selectively connected with an engine output shaft through a first clutch; a second input shaft formed as a hollow shaft, disposed about an external circumference of the first input shaft without any rotational interference, and selectively connected to the engine output shaft through a second clutch; a third input shaft formed as a hollow shaft, disposed about an external circumference of the second input shaft without any rotational interference, and selectively connected to the engine output shaft through a third clutch; a power transmission shaft formed as a hollow shaft and disposed about the external circumference of the second input shaft without any rotational interference in correspondence to a rear side of the third input shaft; first and second center shafts disposed in parallel on the same axis with the first input shaft and selectively connected with each other through a fourth clutch; an idle shaft disposed in parallel by a predetermined distance with the first input shaft; a fixed transmission for selectively shifting torque input according to each gear ratio of four change gear trains disposed by externally gear connecting each drive gear and each driven gear to the first and second input shafts, the power transmission shaft, the first center shaft, and the idle shaft and outputting the torque through the second center shaft and the power transmission shaft; a composite transmission including a planetary gear set in which a sun gear is fixedly connected to one side to the power transmission shaft, configured to fix and connect a planetary carrier with the third input shaft and power connect a ring gear with the second center shaft, and complementarily composite shift and output input torque; and an output shaft disposed in parallel by a predetermined distance with the first input shaft and outputting the torque transmitted from the composite transmission to a final reduction gear.

In this regard, the first, second, third clutches, the fixed transmission, and the composite transmission may be disposed in the following order with respect to a rear side of the engine: the first, second, third clutches, the composite transmission, and the fixed transmission.

Also, the four change gear trains may include a first change gear train including a first drive gear fixedly connected with the power transmission shaft, a first driven gear fixedly connected with the first center axis and externally gear connected with the first drive gear, and an idle output gear fixedly connected with the idle shaft and externally gear connected with the first driven gear; a second change gear train including a second drive gear disposed about the external circumference of the second input shaft without any rotational interference and an idle input gear fixedly connected with the idle shaft and externally gear connected with the second drive gear; a third change gear train including a third drive gear fixedly connected with the first input shaft and a third driven gear disposed about an external circumference of the first center shaft without any rotational interference and externally gear connected with the third drive gear; and a fourth change gear train including a fourth drive gear fixedly connected with the first input shaft and a fourth driven gear disposed about the external circumference of the first center shaft without any rotational interference and externally gear connected with the fourth drive gear.

In this regard, the first drive gear and the second drive gear may be selectively synchronized to the second input shaft by a first synchronizer, and the third driven gear and the fourth driven gear may be selectively synchronized to the first center shaft by a second synchronizer.

Also, the first change gear train may include a gear ratio for forward 2nd speed and 6th speed, the second change gear train may include a gear ratio for a forward 8th speed and reverse, the third change gear train may include a gear ratio for a forward 1st speed and a forward 7th speed, and the fourth change gear train may include a gear ratio for a forward 3rd speed and a forward 5th speed.

Also, in the composite transmission, the sun gear of the planetary gear set is fixedly connected with the power transmission shaft, the planetary carrier is selectively connected with the engine output shaft, and the ring gear is integrally formed with a center output gear on an external circumference, and the center output gear is externally gear connected between a center drive gear fixedly connected with the second center shaft and an output shaft input gear on the output shaft.

Also, the composite transmission may be configured to output torque selectively transmitted through the center drive gear of the second center shaft to the output shaft input gear of the output shaft through the center output gear of the ring gear, and complementarily composite shift torque selectively input to the planetary carrier from the third input shaft and torque shifted from the fixed transmission and input to the sun gear through the power transmission shaft and output the torque to the output shaft input gear of the output shaft through the center output gear.

In this regard, the planetary gear set may include a single pinion planetary gear set.

Also, the power transmission shaft may be selectively connected with a transmission housing through a brake.

In this regard, the first center shaft may be selectively connected with a transmission housing through a brake.

At this time, the first change gear train may include a gear ratio for a forward 2nd speed and a forward 6th speed, the second change gear train may include a gear ratio for a forward 9th speed and reverse, the third change gear train may include a gear ratio for a forward 1st speed and a forward 7th speed, and the fourth change gear train may include a gear ratio for a forward 3rd speed and a forward 5th speed.

Also, the fixed transmission may further include a motor/generator for transmitting torque to the first center shaft.

At this time, in the motor/generator, a motor drive gear may be externally gear connected with an idle input gear of the idle shaft.

Also, a motor/generator selectively transmitting torque to the engine output shaft may be disposed.

At this time, the motor/generator may be selectively connected with the engine output shaft through an engine clutch and with the first, second, and third input shafts through the first, second, and third clutches, respectively.

The power transmission apparatus for a vehicle according to the first exemplary embodiment of the present disclosure may implement a fixed shift stage of forward 8th speed and reverse 1st speed by applying a planetary gear set to a DCT structure using two synchronizers, thereby achieving multi-stages while simplifying an internal configuration, and minimizing a weight to improve mountability and fuel consumption.

Further, the power transmission apparatus for a vehicle according to the second and third exemplary embodiments of the present disclosure may implement a fixed shift stage of forward 9th speed and reverse 1st speed by allowing one of three rotary elements of the planetary gear set to operate as a selective fixed element, in the first exemplary embodiment in which the fixed shift stage of forward 8th speed and reverse 1st speed is implemented by applying the planetary gear set to the DCT structure using the two synchronizers, thereby achieving multi-stages while simplifying an internal configuration, and minimizing a weight to improve mountability and fuel consumption.

Further, the power transmission apparatus for a vehicle according to the fourth exemplary embodiment of the present disclosure may allow one motor/generator to be disposed in parallel with an axial direction, and torque of the motor/generator to be transmitted to one rotary element of a planetary gear set that may operate as a selective fixed element along with a first center shaft in the second exemplary embodiment, thereby enabling traveling in an engine mode and a parallel hybrid mode with a multi-stage fixed shift stage, and, if necessary, enabling traveling in an electronic continuously variable transmission e-CVT mode and an electric vehicle mode to improve fuel consumption.

Further, the power transmission apparatus for a vehicle according to the fifth exemplary embodiment of the present disclosure may allow one motor/generator to be disposed and power connected to a rear end of an engine output shaft through an engine clutch in the second exemplary embodiment, thereby enabling traveling in an engine mode, a parallel hybrid mode, and an electric vehicle mode with a multi-stage fixed shift stage to improve fuel consumption.

Also, in all the exemplary embodiments of the present disclosure, three clutches alternately perform shifting on odd-numbered stages and even-numbered stages, and thus natural shifting is possible without causing a shifting disconnection.

In addition, effects that may be obtained or predicted from an exemplary embodiment of the present disclosure are directly or implicitly disclosed in the detailed description of the exemplary embodiment of the present disclosure. That is, various effects predicted according to an exemplary embodiment of the present disclosure will be disclosed in the detailed description that will be described later.

BRIEF DESCRIPTION OF THE DRAWINGS

FIG. 2 is a table showing a shift operation of a power transmission apparatus for a vehicle according to the first exemplary embodiment of the present disclosure.

FIG. 4 is a table showing a shift operation of a power transmission apparatus for a vehicle according to the second exemplary embodiment of the present disclosure.

FIG. 7 is a table showing a shift operation of a power transmission apparatus for a vehicle according to the fourth exemplary embodiment of the present disclosure.

FIG. 9 is a table showing a shift operation of a power transmission apparatus for a vehicle according to the fifth exemplary embodiment of the present disclosure.

DETAILED DESCRIPTION OF THE EMBODIMENTS

Figure 1:
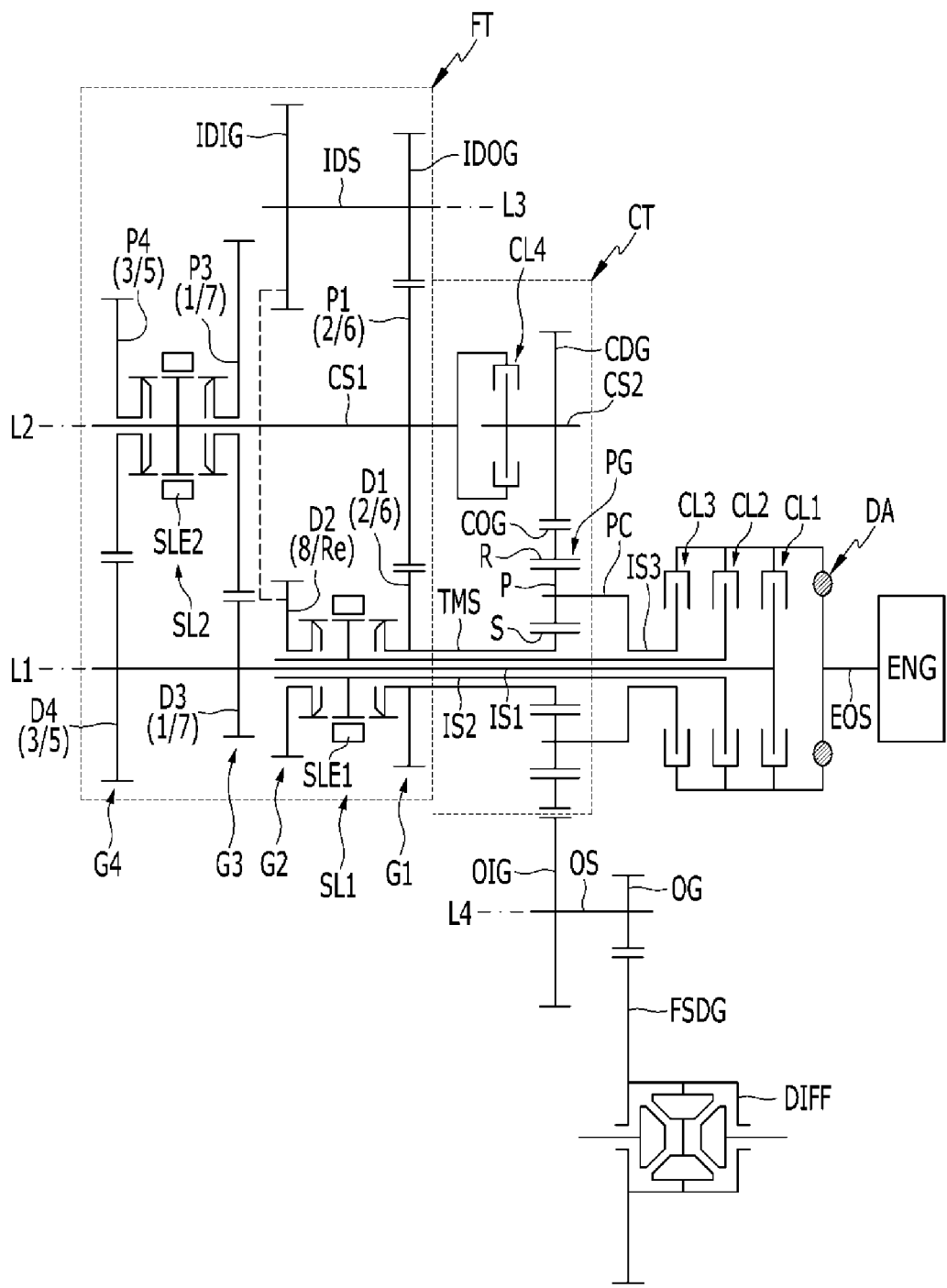
FIG. 1 is a schematic diagram of a power transmission apparatus for a vehicle according to a first exemplary embodiment of the present disclosure.

Hereinafter, the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and the description are to be regarded as illustrative in nature and not restrictive, and the same or similar constituent elements are denoted by the same reference numerals throughout the specification.

In the following description, dividing names of components into first, second and the like is to divide the names because the names of the components are the same as each other and an order thereof is not particularly limited.

FIG. 1 is a schematic diagram of a power transmission apparatus according to a first exemplary embodiment of the present disclosure.

Referring to FIG. 1, the power transmission apparatus according to the first exemplary embodiment of the present disclosure includes first, second, and third input shafts IS1, IS2, and IS3, a power transmission shaft TMS, first and second center shafts CS1 and CS2, a fixed transmission FT, a composite transmission CT, and an output shaft OS.

Accordingly, if the torque of an engine ENG, which is a power source, is shifted in the fixed transmission FT, the shifted torque may be output at an increased transmission ratio in the composite transmission CT by a complementary operation of shifted torque transmitted from the fixed transmission FT and torque selectively transmitted from the engine ENG while a shift stage of 8 forward speeds and 1 reverse speed may be implemented.

The engine ENG, which is the power source, may use various well-known engines such as a gasoline engine or a diesel engine using existing fossil fuel.

The torque generated from the engine ENG is transmitted to the fixed transmission FT and the composite transmission CT according to a connection relationship of the first, second, and third input shafts IS1, IS2, and IS3.

The fixed transmission FT and the composite transmission CT are disposed on first, second, third, and fourth shaft lines L1, L2, L3, and L4 that are in parallel and disposed with respect to each other at a certain distance. The first, second, and third input shaft IS1, IS2, and IS3 and the power transmission shaft TMS are disposed on the first shaft line L1. The first and second center shafts CS1 and CS2 are disposed on the second shaft line L2. The idle shaft IDS is disposed on the third shaft line L3. The output shaft OS is disposed on the fourth shaft line L4.

The first input shaft IS1 disposed on the first shaft line L1 is selectively connected with an engine output shaft EOS (a crank shaft) through a first clutch CL1. The first input shaft IS1 selectively transmits the torque of the engine ENG to the fixed transmission FT.

The second input shaft IS2 is configured as a hollow shaft, is disposed about an external circumference of the first input shaft IS1 without any rotational interference, is selectively connected with the engine output shaft EOS through a second clutch CL2, and selectively transmits the torque of the engine ENG to the fixed transmission FT.

The third input shaft IS3 is configured as a hollow shaft, is disposed about an external circumference of the second input shaft IS2 without any rotational interference, is selectively connected with the engine output shaft EOS through a third clutch CL3, and selectively transmits the torque of the engine ENG to the composite transmission CT.

The power transmission shaft TMS is configured as a hollow shaft and is disposed about the external circumference of the second input shaft IS2 without any rotational interference in correspondence to a rear side of the third input shaft IS3.

The first and second center shafts CS1 and CS2 disposed on the second shaft line L2 are selectively connected with each other through a fourth clutch CL4 while being disposed on the same shaft line.

The idle shaft IDS disposed on the third shaft line L3 is fixedly connected with an idle input gear DIG and an idle output gear IDOG.

The output shaft OS disposed on the fourth shaft line L4 is fixedly connected with an output shaft input gear OIG and a final output gear OG. The final output gear OG is externally gear connected with a final reduction gear FSDG of a differential DIFF.

The fixed transmission FT includes first, second, third, and fourth change gear trains G1, G2, G3, and G4 disposed on the power transmission shaft TMS disposed about the external circumference of the second input shaft IS2 without the rotational interference in correspondence to rear sides of the first and second input shafts IS1 and IS2, the first center shaft CS1, the idle shaft IDS, and the third input shaft IS3.

The first change gear train G1 includes a first drive gear D1 integrally fixedly connected with the power transmission shaft TMS, a first driven gear P1 integrally fixedly connected with the first center axis CS1 and externally gear connected with the first drive gear D1, and the idle output gear IDOG integrally fixedly connected with the idle shaft IDS and externally gear connected with the first driven gear P1.

The second change gear train G2 includes a second drive gear D2 disposed about the external circumference of the second input shaft IS2 without rotational interference and the idle input gear DIG integrally fixedly connected with the idle shaft IDS and externally gear connected with the second drive gear D2.

In the above, a first synchronizer SL1 is disposed between the first drive gear D1 and the second drive gear D2 to selectively synchronize and connect the first drive gear D1 and the second drive gear D2 with the second input shaft IS2.

The third change gear train G3 includes a third drive gear D3 integrally fixedly connected with the first input shaft IS1 and a third driven gear P3 disposed about an external circumference of the first center shaft CS1 without any rotation interference and externally gear connected with the third drive gear D3.

The fourth change gear train G4 includes a fourth drive gear D4 integrally fixedly connected with the first input shaft IS1 and a fourth driven gear P4 disposed about the external circumference of the first center shaft CS1 without any rotation interference and externally gear connected with the fourth drive gear D4.

In the above, a second synchronizer SL2 is disposed between the third driven gear P3 and the fourth driven gear P4 to selectively synchronize and connect the third driven gear P3 and the fourth driven gear P4 with the first center shaft CS1.

The fact that the fixed transmission FT includes the four change gear trains G1, G2, G3 and G4 as described above means that four fixed shift stages may be realized. A gear ratio of the respective drive gears and driven gears forming the four change gear trains G1, G2, G3 and G4 may vary according to design conditions of a necessary transmission.

In the first exemplary embodiment of the present disclosure, the first change gear train G1 exemplifies a gear ratio for shifting of $2^{nd}$ speed and $6^{th}$ speed, the second change gear train G2 for $8^{th}$ speed and reverse, the third change gear train G3 for $1^{st}$ speed and $7^{th}$ speed, and the fourth change gear train G4 for $3^{rd}$ speed and $5^{th}$ speed.

Accordingly, the first and second change gear trains G1 and G2 that perform shifting by receiving the torque of the second input shaft IS2 may implement an even-numbered stage of forward $2^{nd}$, $6^{th}$ and $8^{th}$ speed and a reverse Re shift stage, and the third and fourth change gear trains G3 and G4 that perform shifting by receiving the torque of the first input shaft IS1 may implement an odd-numbered stage of forward $1^{st}$, $3^{rd}$, $5^{th}$, and $7^{th}$ speed.

By the above configuration, the torque shifted through the four change gear trains G1, G2, G3, and G4 in the fixed transmission FT is transmitted to the composite transmission CT through two paths. One of the two paths is used to transmit the torque through the second center shaft CS2, and the other one is used to transmit the torque through the first change gear train G1 and the power transmission shaft TMS.

In the above, the first and second synchronizers SL1 and SL2 are well-known configurations and thus detailed descriptions thereof are omitted. Sleeves SLE1 and SLE2 applied to the first and second synchronizers SL1 and SL2 include a separate actuator (not shown) as known in the art. The actuator is controlled by a transmission control unit to perform shifting.

The composite transmission CT includes the second center shaft CS2 selectively connected with the first center shaft CS1 through the fourth clutch CL4 and one planetary gear set PG disposed on the power transmission shaft TMS. The planetary gear set PG is connected through a sun gear S on the power transmission shaft TMS between the engine ENG and the fixed transmission FT.

The fourth clutch CL4 is configured to selectively connect the first center shaft CS1 and the second center shaft CS2 such that the first and second center shafts CS1 and CS2 are power connected if necessary.

The planetary gear set PG is a single pinion planetary gear set and includes the sun gear S, a planetary carrier PC that rotatably supports a plurality of pinion gears P externally gear connected with the sun gear S, and a ring gear R internally gear connected with the plurality of pinion gears P.

The sun gear S is fixedly connected with the power transmission shaft TMS disposed about an external circumference of the second input shaft IS2 without any rotational interference. The planetary carrier PC is fixedly connected with the third input shaft IS3. The ring gear R is an output element and forms the center output gear COG in an external circumference.

The center output gear COG is externally gear connected with the center drive gear CDG fixedly connected on the second center shaft CS2 and is externally gear connected with the output shaft input gear OIG fixedly connected on the output shaft OS.

By the above configuration, the composite transmission CT transmits torque transmitted from the center drive gear CDG of the second center shaft CS2 to the center output gear COG to the output shaft input gear OIG.

Also, when torque of the engine ENG is input to the planetary carrier PC through the third input shaft IS3 by operational control of the third clutch CL3 and an operation of the fourth clutch CL4 is controlled in the composite transmission CT, the planetary gear set PG, the first change gear train G1, and the first and second center shafts CS1 and CS2 form one closed circuit power transmission path and complementarily operate with each other according to a gear ratio of the first change gear train G1 and a gear ratio of the center drive gear CDG and the center output gear COG and thus the torque of the engine ENG is synthesized and shifted to output.

Also, in a state where the torque of the engine ENG is input to the planetary carrier PC through the third input shaft IS3 by operational control of the third clutch CL3 in the composite transmission CT, the torque of the engine ENG may be shifted by a differential operation and output according to a rotation condition (forward rotation, fixed, reverse rotation, etc.) of the sun gear S.

In the above, the first, second, third, and fourth clutches CL1, CL2, CL3, and CL4 that are friction devices are hydraulic pressure friction coupling units operating by hydraulic pressure supplied from a hydraulic pressure control apparatus and mainly use wet multi-plate hydraulic pressure friction coupling units. The first, second, third, and fourth clutches CL1, CL2, CL3, and CL4 include coupling units that may operate according to an electric signal supplied from an electronic control apparatus such as a dog clutch, an electronic clutch, a magnetic type clutch, etc.

In FIG. 1 above, the reference numeral "DA" denotes a damper that absorbs a torque change of the engine ENG.

FIG. 2 is a table showing a shift operation of a power transmission apparatus according to the first exemplary embodiment of the present disclosure. A shifting process is as follows.

Reverse

A reverse shift stage REV synchronizes the second drive gear D2 and the second input shaft IS2 through the sleeve SEL1 of the first synchronizer SL1 and allows the second clutch CL2 and the fourth clutch CL4 to operate. The second synchronizer SL2 is in a neutral state.

Accordingly, torque of the engine ENG is reverse rotation output to the final reduction gear FDSG of the differential DIFF to perform reverse travel by an operation of the second clutch CL2 through the second clutch CL2, the second input shaft IS2, the second drive gear D2, the idle input gear IDIG, the idle shaft IDS, the idle output gear IDOG, the first driven gear P1, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 1st speed

A forward 1st speed FD1 synchronizes the third driven gear P3 and the first center shaft CS1 through the sleeve SEL2 of the second synchronizer SL2 and allows the first clutch CL1 and the fourth clutch CL4 to operate. The first synchronizer SL1 is in a neutral state.

Accordingly, the torque of the engine ENG is transmitted to the final reduction gear FDSG of the differential DIFF to perform forward 1st speed travel by an operation of the first clutch CL1 through the first clutch CL1, the first input shaft IS1, the third drive gear D3, the third driven gear P3, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 2nd speed

A forward 2nd speed FD2 synchronizes the first drive gear D1 and the second input shaft IS2 through the sleeve SEL1 of the first synchronizer SL1 and allows the second clutch CL2 and the fourth clutch CL4 to operate. The second synchronizer SL2 is in a neutral state.

Accordingly, the torque of the engine ENG is transmitted to the final reduction gear FDSG of the differential DIFF to perform forward 2nd speed travel by an operation of the second clutch CL2 through the second clutch CL2, the second input shaft IS2, the first drive gear D1, the first driven gear P1, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 3rd speed

A forward 3rd speed FD3 synchronizes the fourth driven gear P4 and the first center shaft CS1 through the sleeve SEL2 of the second synchronizer SL2 and allows the first clutch CL1 and the fourth clutch CL4 to operate. The first synchronizer SL1 is in a neutral state.

Accordingly, the torque of the engine ENG is transmitted to the final reduction gear FDSG of the differential DIFF to perform forward 3rd speed travel by the operation of the first clutch CL1 through the first clutch CL1, the first input shaft IS1, the fourth drive gear D4, the fourth driven gear P4, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 4th speed

A forward 4th speed FD4 allows the third clutch CL3 and the fourth clutch CL4 to operate in a neutral state of both the first and second synchronizer SL1 and SL2.

Accordingly, in a state where the torque of the engine ENG is directly input to the planetary carrier PC through the third input shaft IS3 by operation control of the third clutch CL3, an operation of the fourth clutch CL4 is controlled.

Then, since the planetary gear set PG, the first change gear train G1, and the first and second center shafts CS1 and CS2 form one closed circuit power transmission path and an input is made through the planetary carrier PC of the planetary gear set PG, they complementarily operate to each other according to a gear ratio of the first change gear train G1 and a gear ratio of the center drive gear CDG and the center output gear COG and are synthesized and shifted such that the torque of the engine ENG is transmitted to the final reduction gear FDSG of the differential DIFF through the center output gear COG, the output shaft input gear OIG, the output shaft OS, and the final output gear OG to perform forward 4th speed travel.

Forward 5th speed

A forward 5th speed FD5 synchronizes the fourth driven gear P4 and the first center shaft CS1 through the sleeve SEL2 of the second synchronizer SL2 and allows the first clutch CL1 and the third clutch CL3 to operate. The first synchronizer SL1 is in a neutral state.

Accordingly, a portion of the torque of the engine ENG is input to the sun gear S of the composite transmission CT by the operation of the first clutch CL1 through the first clutch CL1, the first input shaft IS1, the fourth drive gear D4, the fourth driven gear P4, the first center shaft CS1, the first driven gear P1, the first drive gear D1, and the power transmission shaft TMS. Another portion of the torque of the engine ENG is directly input to the planetary carrier PC of the composite transmission CT by an operation of the third clutch CL3.

Then, the torque of the engine ENG differentially operates by a difference of the number of rotations of the sun gear S and the number of rotations of the planetary carrier PC in the planetary gear set PG of the composite transmission CT and is output through the ring gear R and is transmitted to the final reduction gear FDSG of the differential DIFF through the center output gear COG, the output shaft input gear OIG, the output shaft OS, and the final output gear OG to perform forward 5th speed travel.

Forward 6th speed

A forward 6th speed FD6 synchronizes the first drive gear D1 and the second input shaft IS2 through the sleeve SEL1 of the first synchronizer SL1 and allows the second clutch CL2 and the third clutch CL3 to operate. The second synchronizer SL2 is in a neutral state.

Accordingly, a portion of the torque of the engine ENG is input to the sun gear S of the composite transmission CT by the operation of the second clutch CL2 through the second clutch CL2, the second input shaft IS2, the first drive gear D1, and the power transmission shaft TMS. Another portion of the torque of the engine ENG is directly input to the planetary carrier PC of the composite transmission CT by the operation of the third clutch CL3.

Then, since the torque of the engine ENG is simultaneously input through the sun gear S and the planetary carrier PC in the planetary gear set PG of the composite transmission CT, in a state where the planetary gear set PG rotates as one, the torque of the engine ENG is output through the ring gear R as is input and is transmitted to the final reduction gear FDSG of the differential DIFF through the center output gear COG, the output shaft input gear OIG, the output shaft OS, and the final output gear OG to perform forward 6th speed travel.

Forward 7th speed

A forward 7th speed FD7 synchronizes the third driven gear P3 and the first center shaft CS1 through the sleeve SEL2 of the second synchronizer SL2 and allows the first clutch CL1 and the third clutch CL3 to operate. The first synchronizer SL1 is in a neutral state.

Accordingly, a portion of the torque of the engine ENG is input to the sun gear S of the composite transmission CT by the operation of the first clutch CL1 through the first clutch CL1, the first input shaft IS1, the third drive gear D3, the third driven gear P3, the first center shaft CS1, the first driven gear P1, the first drive gear D1, and the power transmission shaft TMS. Another portion of the torque of the engine ENG is directly input to the planetary carrier PC of the composite transmission CT by the operation of the third clutch CL3.

Then, the torque of the engine ENG differentially operates by a difference of the number of rotations of the sun gear S and the number of rotations of the planetary carrier PC in the planetary gear set PG of the composite transmission CT, is increased in speed, is output through the ring gear R and is transmitted to the final reduction gear FDSG of the differential DIFF through the center output gear COG, the output shaft input gear OIG, the output shaft OS, and the final output gear OG to perform forward 7th speed travel.

Forward 8th speed

A forward 8th speed FD8 synchronizes the second drive gear D2 and the second input shaft IS2 through the sleeve SEL1 of the first synchronizer SL1 and allows the second clutch CL2 and the third clutch CL3 to operate. The second synchronizer SL2 is in a neutral state.

Accordingly, a portion of the torque of the engine ENG is reverse rotation input to the sun gear S of the composite transmission CT by the operation of the second clutch CL2 through the second clutch CL2, the second input shaft IS2, the second drive gear D2, the idle input gear IDIG, the idle shaft IDS, the idle output gear IDOG, the first driven gear P1, the first drive gear D1, and the power transmission shaft TMS. Another portion of the torque of the engine ENG is directly input to the planetary carrier PC of the composite transmission CT by the operation of the third clutch CL3.

Then, since an input is made to the planetary carrier PC in a state where the sun gear S reversely rotates in the planetary gear set PG of the composite transmission CT, the ring gear R that is an output element is further increased in speed, and thus the torque of the engine ENG is transmitted to the final reduction gear FDSG of the differential DIFF through the center output gear COG, the output shaft input gear OIG, the output shaft OS, and the final output gear OG to perform forward 8th speed travel that is a highest shift stage.

Figure 3:
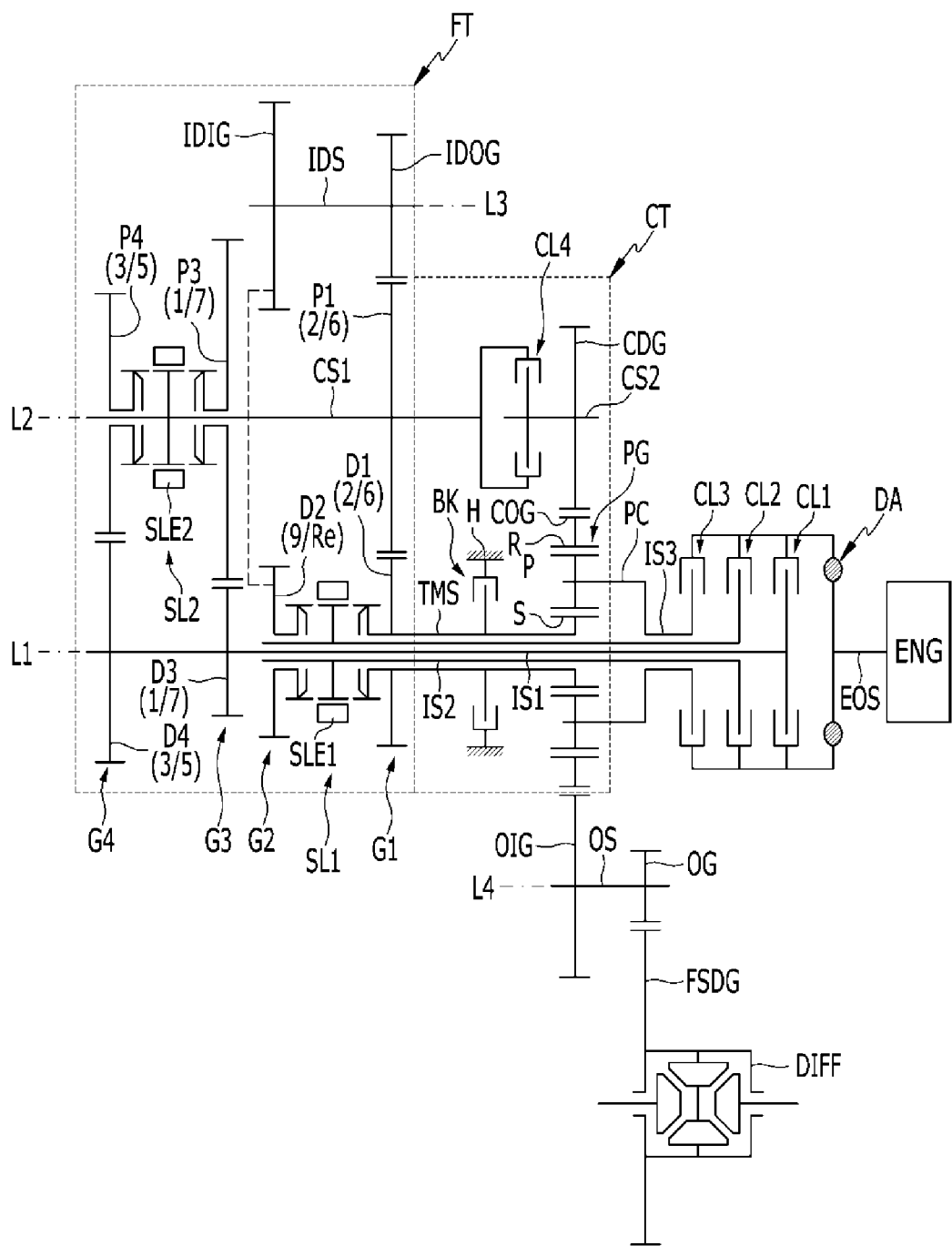
FIG. 3 is a schematic diagram of a power transmission apparatus for a vehicle according to a second exemplary embodiment of the present disclosure.

FIG. 3 is a schematic diagram of a power transmission apparatus according to a second exemplary embodiment of the present disclosure.

Referring to FIG. 3, in the second exemplary embodiment of the present disclosure, the power transmission shaft TMS is selectively connected to a transmission housing H through a brake BK in the first exemplary embodiment so that the sun gear S of the composite transmission CT may operate as a selective fixed element, and thus a shift stage of forward 9th speed and reverse 1st speed may be implemented.

Therefore, in the power transmission apparatus of the second exemplary embodiment of the present disclosure, a brake BK is added, and the second drive gear D2 is changed from a forward 8th speed and reverse drive gear 8/Re to a forward 9th speed and reverse drive gear 9/Re, compared to the first exemplary embodiment.

FIG. 4 is a table showing a shift operation of a power transmission apparatus according to the second exemplary embodiment of the present disclosure.

Reverse

The reverse shift stage REV synchronizes the second drive gear D2 and the second input shaft IS2 through the sleeve SEL1 of the first synchronizer SL1 and allows the second clutch CL2 and the fourth clutch CL4 to operate. The second synchronizer SL2 is in a neutral state.

Accordingly, torque of the engine ENG is reverse rotation output to the final reduction gear FDSG of the differential DIFF to perform reverse travel by an operation of the second clutch CL2 through the second clutch CL2, the second input shaft IS2, the second drive gear D2, the idle input gear IDIG, the idle shaft IDS, the idle output gear IDOG, the first driven gear P1, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 1st speed

The forward 1st speed FD1 synchronizes the third driven gear P3 and the first center shaft CS1 through the sleeve SEL2 of the second synchronizer SL2 and allows the first clutch CL1 and the fourth clutch CL4 to operate. The first synchronizer SL1 is in a neutral state.

Accordingly, the torque of the engine ENG is transmitted to the final reduction gear FDSG of the differential DIFF to perform forward 1st speed travel by an operation of the first clutch CL1 through the first clutch CL1, the first input shaft IS1, the third drive gear D3, the third driven gear P3, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 2nd speed

The forward 2nd speed FD2 synchronizes the first drive gear D1 and the second input shaft IS2 through the sleeve SEL1 of the first synchronizer SL1 and allows the second clutch CL2 and the fourth clutch CL4 to operate. The second synchronizer SL2 is in a neutral state.

Accordingly, the torque of the engine ENG is transmitted to the final reduction gear FDSG of the differential DIFF to perform forward 2nd speed travel by an operation of the second clutch CL2 through the second clutch CL2, the second input shaft IS2, the first drive gear D1, the first driven gear P1, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 3rd speed

The forward 3rd speed FD3 synchronizes the fourth driven gear P4 and the first center shaft CS1 through the sleeve SEL2 of the second synchronizer SL2 and allows the first clutch CL1 and the fourth clutch CL4 to operate. The first synchronizer SL1 is in a neutral state.

Accordingly, the torque of the engine ENG is transmitted to the final reduction gear FDSG of the differential DIFF to perform forward 3rd speed travel by the operation of the first clutch CL1 through the first clutch CL1, the first input shaft IS1, the fourth drive gear D4, the fourth driven gear P4, the first center shaft CS1, the fourth clutch CL4, the second center shaft CS2, the center drive gear CDG, the center output gear COG, the output shaft input gear OIG, the output shaft OS, and the final output gear OG.

At this time, the composite transmission CT has no influence on reverse shifting.

Forward 4th speed

The forward 4th speed FD4 allows the third clutch CL3 and the fourth clutch CL4 to operate in a neutral state of both the first and second synchronizer SL1 and SL2.

Accordingly, in a state where the torque of the engine ENG is directly input to the planetary carrier PC through the third input shaft IS3 by operation control of the third clutch CL3, an operation of the fourth clutch CL4 is controlled.

Then, since the planetary gear set PG, the first change gear train G1, and the first and second center shafts CS1 and CS2 form one closed circuit power transmission path and an input is made through the planetary carrier PC of the planetary gear set PG, they complementarily operate to each other according to a gear ratio of the first change gear train G1 and a gear ratio of the center drive gear CDG and the center output gear COG and are synthesized and shifted such that the torque of the engine ENG is transmitted to the final reduction gear FDSG of the differential DIFF through the center output gear COG, the output shaft input gear OIG, the output shaft OS, and the final output gear OG to perform forward 4th speed travel.

Forward 5th speed

The forward 5th speed FD5 synchronizes the fourth driven gear P4 and the first center shaft CS1 through the sleeve SEL2 of the second synchronizer SL2 and allows the first clutch CL1 and the third clutch CL3 to operate. The first synchronizer SL1 is in a neutral state.

Accordingly, a portion of the torque of the engine ENG is input to the sun gear S of the composite transmission CT by the operation of the first clutch CL1 through the first clutch CL1, the first input shaft IS1, the fourth drive gear D4, the fourth driven gear P4, the first center shaft CS1, the first driven gear P1, the first drive gear D1, and the power transmission shaft TMS. Another portion of the torque of the engine ENG is directly input to the planetary carrier PC of the composite transmission CT by an operation of the third clutch CL3.

Then, the torque of the engine ENG differentially operates by a difference of the number of rotations of the sun gear S and the number of rotations of the planetary carrier PC in the planetary gear set PG of the composite transmission CT and is output through the ring gear R and is transmitted to the final reduction gear FDSG of the differential DIFF through the center output gear COG, the output shaft input gear OIG, the output shaft OS, and the final output gear OG to perform forward 5th speed travel.

Forward 6th speed

The forward 6th speed FD6 synchronizes the first drive gear D1 and the second input shaft IS2 through the sleeve SEL1 of the first synchronizer SL1 and allows the second clutch CL2 and the third clutch CL3 to operate. The second synchronizer SL2 is in a neutral state.

Accordingly, a portion of the torque of the engine ENG is input to the sun gear S of the composite transmission CT by the operation of the second clutch CL2 through the second clutch CL2, the second input shaft IS2, the first drive gear D1, and the power transmission shaft TMS. Another portion of the torque of the engine ENG is directly input to the planetary carrier PC of the composite transmission CT by the operation of the third clutch CL3.

Then, since the torque of the engine ENG is simultaneously input through the sun gear S and the planetary carrier PC in the planetary gear set PG of the composite transmission CT, in a state where the planetary gear set PG rotates as one, the torque of the engine ENG is output through the ring gear R as is input and is transmitted to the final reduction gear FDSG of the differential DIFF through the center output gear COG, the output shaft input gear OIG, the output shaft OS, and the final output gear OG to perform forward 6th speed travel.

Forward 7th speed

The forward 7th speed FD7 synchronizes the third driven gear P3 and the first center shaft CS1 through the sleeve SEL2 of the second synchronizer SL2 and allows the first clutch CL1 and the third clutch CL3 to operate. The first synchronizer SL1 is in a neutral state.

Accordingly, a portion of the torque of the engine ENG is input to the sun gear S of the composite transmission CT by the operation of the first clutch CL1 through the first clutch CL1, the first input shaft IS1, the third drive gear D3, the third driven gear P3, the first center shaft CS1, the first driven gear P1, the first drive gear D1, and the power transmission shaft TMS. Another portion of the torque of the engine ENG is directly input to the planetary carrier PC of the composite transmission CT by the operation of the third clutch CL3.

Then, the torque of the engine ENG differentially operates by a difference of the number of rotations of the sun gear S and the number of rotations of the planetary carrier PC in the planetary gear set PG of the composite transmission CT, is increased in speed, is output through the ring gear R and is transmitted to the final reduction gear FDSG of the differential DIFF through the center output gear COG, the output shaft input gear OIG, the output shaft OS, and the final output gear OG to perform forward 7th speed travel.

Forward 8th speed

The forward 8th speed FD8 allows the third clutch CL3 and the brake BK to operate in a neutral state of both the first and second synchronizer SL1 and SL2.

Accordingly, in a state where the torque of the engine ENG is directly input to the planetary carrier PC of the composite transmission CT by the operation of the third clutch CL3, the sun gear S of the composite transmission CT connected to the first center shaft CS1 through the first change gear train G1 operates as a fixed element by an operation of the brake BK.

Then, since an input is made to the planetary carrier PC in a state where the sun gear S operates as the fixed element in the planetary gear set PG of the composite transmission CT, the ring gear R that is an output element is increased in speed, and thus the torque of the engine ENG is transmitted to the final reduction gear FDSG of the differential DIFF through the center output gear COG, the output shaft input gear OIG, the output shaft OS, and the final output gear OG to perform forward 8th speed travel.

Forward 9th speed

A forward 9th speed FD9 synchronizes the second drive gear D2 and the second input shaft IS2 through the sleeve SEL1 of the first synchronizer SL1 and allows the second clutch CL2 and the third clutch CL3 to operate. The second synchronizer SL2 is in a neutral state.

Accordingly, a portion of the torque of the engine ENG is reverse rotation input to the sun gear S of the composite transmission CT by the operation of the second clutch CL2 through the second clutch CL2, the second input shaft IS2, the second drive gear D2, the idle input gear IDIG, the idle shaft IDS, the idle output gear IDOG, the first driven gear P1, the first drive gear D1, and the power transmission shaft TMS. Another portion of the torque of the engine ENG is directly input to the planetary carrier PC of the composite transmission CT by the operation of the third clutch CL3.

Then, since an input is made to the planetary carrier PC in a state where the sun gear S reversely rotates in the planetary gear set PG of the composite transmission CT, the ring gear R that is an output element is further increased in speed, and thus the torque of the engine ENG is transmitted to the final reduction gear FDSG of the differential DIFF through the center output gear COG, the output shaft input gear OIG, the output shaft OS, and the final output gear OG to perform forward 9th speed travel that is a highest shift stage.

In the power transmission apparatus of the second exemplary embodiment according to the present disclosure, forward 1st speed through 7th speed shifting is performed in the same manner as in the first exemplary embodiment, and a new shifting process of forward 8th speed is added, which changes forward 8th speed of the first exemplary embodiment to forward 9th speed, and thus the shift stage of forward 9th speed and reverse 1st speed may be implemented.

Figure 5:
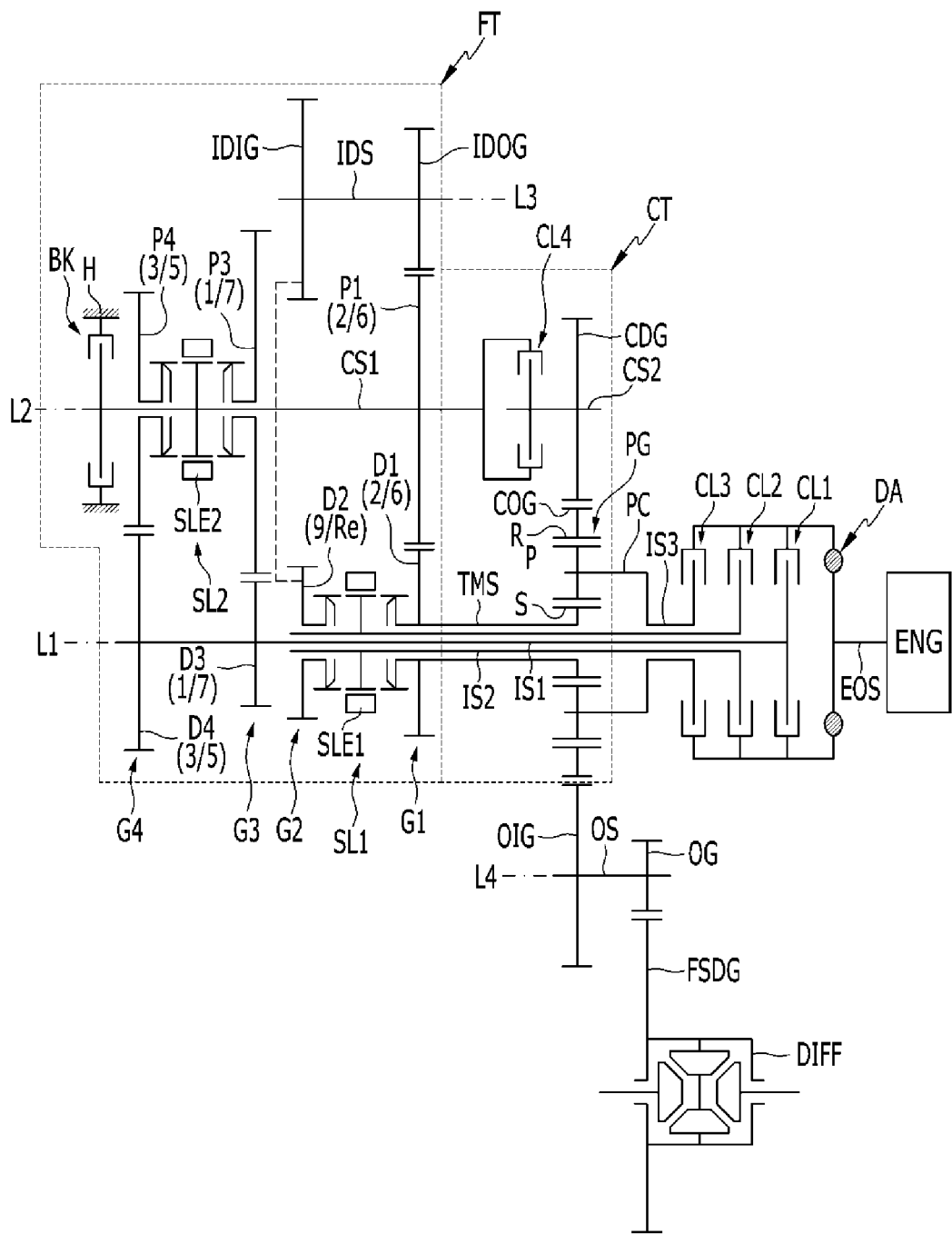
FIG. 5 is a schematic diagram of a power transmission apparatus for a vehicle according to a third exemplary embodiment of the present disclosure.

FIG. 5 is a schematic diagram of a power transmission apparatus for a vehicle according to a third exemplary embodiment of the present disclosure.

Referring to FIG. 5, in the third exemplary embodiment of the present disclosure, the brake BK applied to the second exemplary embodiment is disposed between the first center shaft CS1 and the transmission housing H such that the first center shaft CS1 is selectively connected with the transmission housing H, and thus a shift stage of forward 9th speed and reverse 1st speed may be implemented.

The power transmission apparatus according to the third exemplary embodiment of the present disclosure differs only in the position of the brake BK and a functional characteristic in which the sun gear S of the composite transmission CT may operate as a selective fixed element remains the same, compared to the second exemplary embodiment. Further, a shifting process of the third embodiment is performed in the same manner as in the second embodiment, and thus a detailed description thereof will be omitted.

Figure 6:
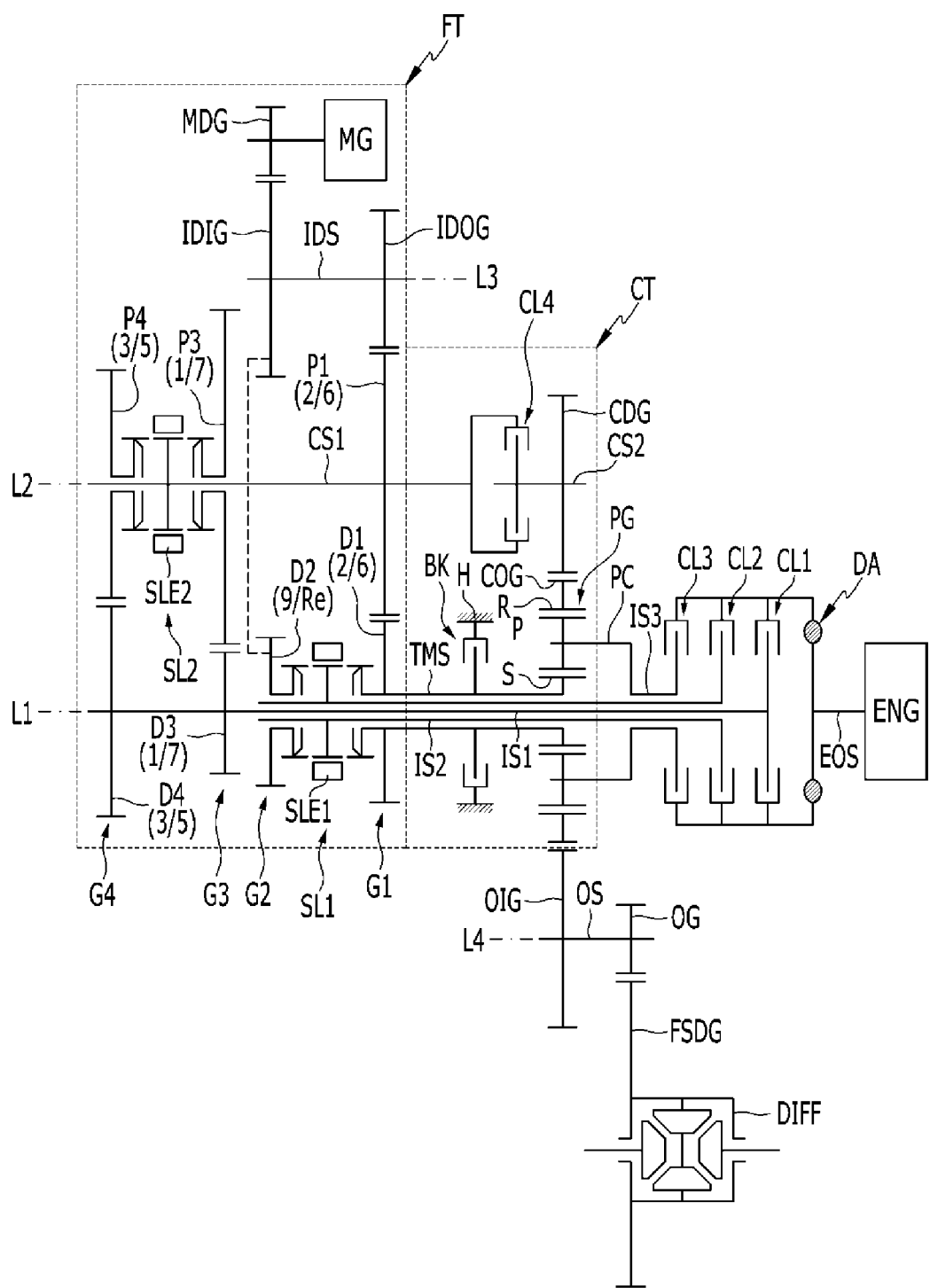
FIG. 6 is a schematic diagram of a power transmission apparatus for a vehicle according to a fourth exemplary embodiment of the present disclosure.

FIG. 6 is a schematic diagram of a power transmission apparatus for a vehicle according to a fourth exemplary embodiment of the present disclosure.

Referring to FIG. 6, in the fourth exemplary embodiment of the present disclosure, the motor/generator MG that is an auxiliary power source in the second exemplary embodiment is further disposed to enable traveling by torque of the engine ENG and simultaneously, traveling in a parallel hybrid mode, an electronic continuously variable transmission e-CVT mode and an electric vehicle EV mode.

The motor/generator MG performs a motor and generator function as known in the art. A motor drive gear MDG of the motor/generator MG is externally gear connected with the idle input gear IDIG of the second change gear train G2 such that torque of the motor/generator MG may be transmitted to the first drive gear D1 through the idle input gear IDIG, the idle shaft IDS, the idle output gear ISOG, and the first driven gear P1 or may be transmitted to the second center shaft CS2 by an operation of the fourth clutch CL4 if necessary.

The fourth exemplary embodiment is the same as the second exemplary embodiment in all the configurations except that the motor/generator MG is added, and thus a detailed description of the configuration will be omitted.

FIG. 7 is a table showing a shift operation of a power transmission apparatus for a vehicle according to the fourth exemplary embodiment of the present disclosure.

Referring to FIG. 7, a shifting process of a fixed shift stage of the first 1st speed FD1 through forward 9th speed FD9 and the reverse 1st speed REV by a drive of the engine ENG is performed in the same manner as a shifting process of the second exemplary embodiment, and thus a description thereof is omitted. Further, a torque assist drive is possible by the motor/generator MG during the shifting process by the drive of the engine ENG, which enables traveling in a parallel hybrid mode.

Also, in an electronic continuously variable transmission e-CVT mode, an operation of the third clutch CL3 is controlled in a neutral state of the first and second synchronizers SL1 and SL2.

Then, in a state where torque of the engine ENG is input to the planetary carrier PC through the third clutch CL3 and the third input shaft IS3, if an operation of the motor/generator MG is controlled, a torque of the engine ENG may be assisted.

Also, in an electric vehicle EV mode, a power source is changed from the engine ENG to the motor/generator MG, and an operation of the fourth clutch CL4 is controlled, and thus reverse REV and forward FD traveling of the electric vehicle EV mode may be possible by forward/reverse rotations of the motor/generator MG.

Figure 8:
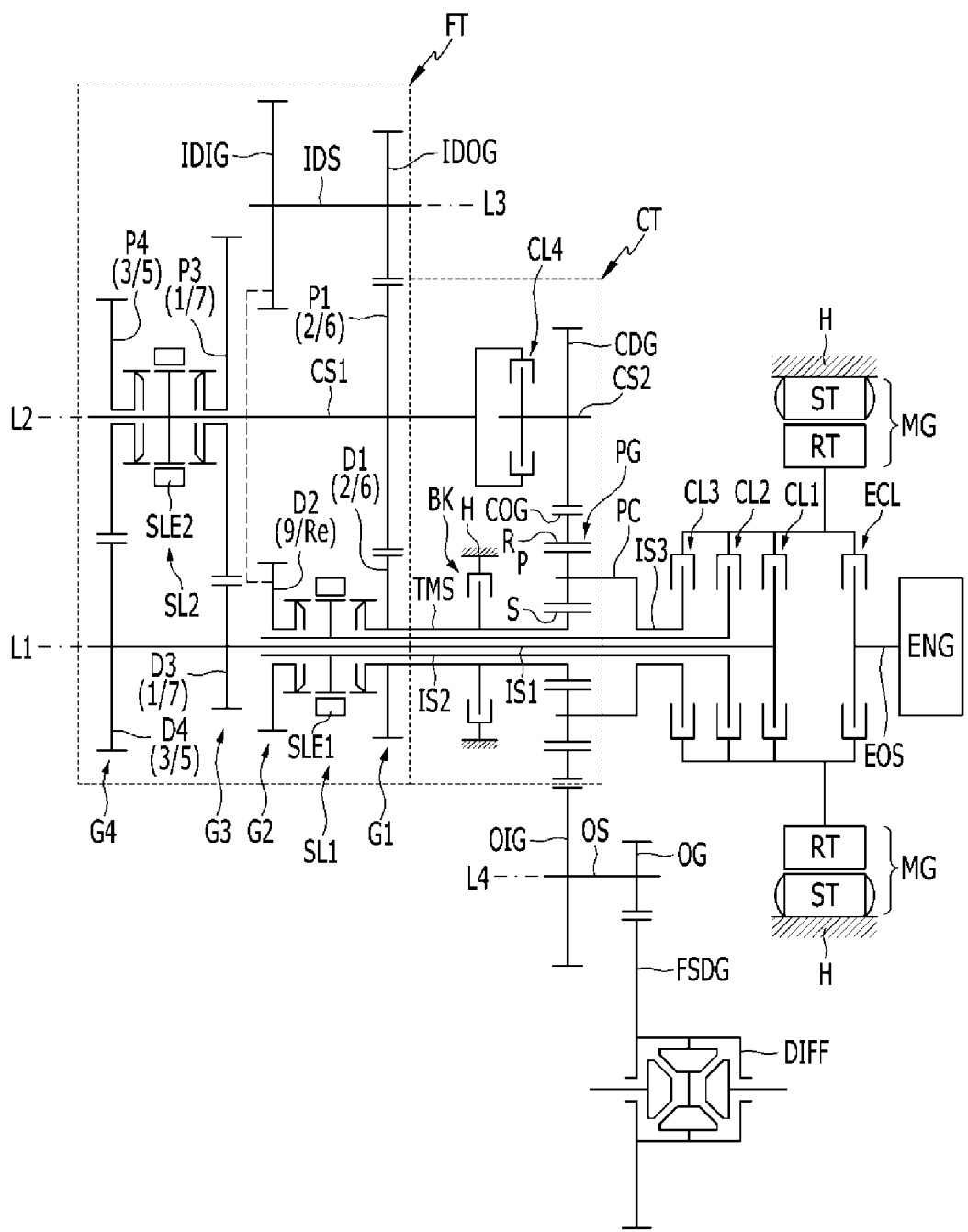
FIG. 8 is a schematic diagram of a power transmission apparatus for a vehicle according to a fifth exemplary embodiment of the present disclosure.

FIG. 8 is a schematic diagram of a power transmission apparatus for a vehicle according to a fifth exemplary embodiment of the present disclosure.

Referring to FIG. 8, in the fifth exemplary embodiment of the present disclosure, the motor/generator MG that is an auxiliary power source in the second exemplary embodiment is further disposed to enable traveling in a parallel hybrid mode and an electric vehicle EV mode.

The motor/generator MG performs a motor and generator function as known in the art and includes a stator ST fixed to the transmission housing H and a rotor RT rotatably supported inside of the stator ST in a radial direction.

The motor/generator MG is disposed in a rear side of the engine ENG such that the rotor RT is selectively connected with an engine output shaft EOS through an engine clutch ECL and is selectively connected with the first, second, and third input shafts IS1, IS2, and IS3 through the first, second, and third clutches CL1, CL2, and CL3, respectively.

Accordingly, when traveling is to be performed by torque of the engine ENG, an operation of the engine clutch ECL is controlled. At this time, the motor/generator MG may enable torque assist and thus a parallel hybrid travel mode may be possible.

When traveling is to be performed by torque of the motor/generator MG in the electric vehicle EV mode, in a state where the operation of the engine clutch ECL is released, traveling is possible only by the torque of the motor/generator MG.

FIG. 9 is a table showing a shift operation of a power transmission apparatus for a vehicle according to the fifth exemplary embodiment of the present disclosure.

Referring to FIG. 9, in the fifth exemplary embodiment of the present disclosure, the engine clutch ECL operates in a fixed shift stage of the first forward 1st speed FD1 through forward 9th speed FD9 and the reverse 1st speed REV by a drive of the engine ENG. A shifting process in the fifth exemplary embodiment is performed in the same manner as a shifting process of the second exemplary embodiment, and thus a detailed description thereof is omitted. At this time, a torque assist drive is possible by the motor/generator MG, which enables traveling in a parallel hybrid mode.

Also, in the electric vehicle EV mode, a power source is merely changed from the engine ENG to the motor/generator MG, and a shifting process of the forward 1st speed FD1 through the forward 9th speed FD9 and the reverse 1st speed REV is the same, and thus a detailed description thereof is omitted.

As described above, the power transmission apparatus for a vehicle according to the first exemplary embodiment of the present disclosure may implement a fixed shift stage of forward 8th speed and reverse 1st speed by applying the one planetary gear set PG to a DCT structure using the two synchronizers SL1 and SL2, thereby achieving multi-stages of the shift stage while simplifying an internal configuration, and minimizing a weight to improve mountability and fuel consumption.

Further, the power transmission apparatus for a vehicle according to the second and third exemplary embodiments of the present disclosure may implement a fixed shift stage of forward 9 th speed and reverse 1 th speed by allowing one of three rotary elements of the planetary gear set PG to operate as a selective fixed element, in the first exemplary embodiment in which the fixed shift stage of forward 8 th speed and reverse 1 th speed is implemented by applying the planetary gear set PG to the DCT structure using the two synchronizers SL1 and SL2, thereby achieving multi-stages of the shift stage while simplifying an internal configuration, and minimizing a weight to improve mountability and fuel consumption.

Further, the power transmission apparatus for a vehicle according to the fourth exemplary embodiment of the present disclosure may allow the one motor/generator MG to be disposed in parallel with an axial direction, and torque of the motor/generator MG to be transmitted to the sun gear S of the planetary gear set PG that may operate as a selective fixed element along with the first center shaft CS1 in the second exemplary embodiment, thereby enabling traveling in an engine mode and a parallel hybrid mode with a multi-stage fixed shift stage, and, if necessary, enabling traveling in an electronic continuously variable transmission e-CVT mode and an electric vehicle EV mode to improve fuel consumption.

Further, the power transmission apparatus for a vehicle according to the fifth exemplary embodiment of the present disclosure may allow the one motor/generator MG to be serially disposed and power connected to a rear end of the engine ENG in the second exemplary embodiment, thereby enabling traveling in an engine mode, a parallel hybrid mode, and an electric vehicle EV mode with a multi-stage fixed shift stage to improve fuel consumption.

Also, in all the exemplary embodiments of the present disclosure, upon transmission, the three clutches CL1, CL2, and CL3 alternately perform shifting on odd-numbered stages and even-numbered stages, and thus natural shifting is possible without causing a shifting disconnection.

While the present disclosure has been particularly shown and described with reference to exemplary embodiments thereof, it will be apparent to those skilled in the art that various modifications and variations may be made in the present disclosure without departing from the spirit or scope of the disclosure as defined in the appended claims.

What is claimed is:

1. A power transmission apparatus for a vehicle, comprising:
    a first input shaft selectively connected with an engine output shaft through a first clutch;
    a second input shaft formed as a hollow shaft, disposed about an external circumference of the first input shaft without any rotational interference, and selectively connected to the engine output shaft through a second clutch;
    a third input shaft formed as a hollow shaft, disposed about an external circumference of the second input shaft without any rotational interference, and selectively connected to the engine output shaft through a third clutch;
    a power transmission shaft formed as a hollow shaft and disposed about the external circumference of the second input shaft without any rotational interference in correspondence to a rear side of the third input shaft;
    first and second center shafts disposed in parallel on the same axis with the first input shaft and selectively connected with each other through a fourth clutch;
    an idle shaft disposed in parallel by a predetermined distance with the first input shaft;
    a fixed transmission for selectively shifting torque input according to each gear ratio of four change gear trains disposed by externally gear connecting each drive gear and each driven gear to the first and second input shafts, the power transmission shaft, the first center shaft, and the idle shaft and outputting the torque through the second center shaft and the power transmission shaft;
    a composite transmission including a planetary gear set in which a sun gear is fixedly connected to one side to the power transmission shaft, configured to fix and connect a planetary carrier with the third input shaft and power connect a ring gear with the second center shaft;
    and an output shaft disposed in parallel by a predetermined distance with the first input shaft and outputting the torque transmitted from the composite transmission to a final reduction gear.

2. The power transmission apparatus of claim 1, wherein:
    the first, second, third clutches, the fixed transmission, and the composite transmission are disposed in the following order with respect to a rear side of the engine: the first, second, third clutches, the composite transmission, and the fixed transmission.

3. The power transmission apparatus of claim 1, wherein:
    the four change gear trains include:
    a first change gear train including a first drive gear fixedly connected with the power transmission shaft, a first driven gear fixedly connected with the first center shaft and externally gear connected with the first drive gear, and an idle output gear fixedly connected with the idle shaft and externally gear connected with the first driven gear;
    a second change gear train including a second drive gear disposed in the external circumference of the second input shaft without any rotational interference and an idle input gear fixedly connected with the idle shaft and externally gear connected with the second drive gear;
    a third change gear train including a third drive gear fixedly connected with the first input shaft and a third driven gear disposed about an external circumference of the first center shaft without any rotational interference and externally gear connected with the third drive gear; and
    a fourth change gear train including a fourth drive gear fixedly connected with the first input shaft and a fourth driven gear disposed about the external circumference of the first center shaft without any rotational interference and externally gear connected with the fourth drive gear.

4. The power transmission apparatus of claim 3, wherein:
    the first drive gear and the second drive gear are selectively synchronized to the second input shaft by a first synchronizer, and
    the third driven gear and the fourth driven gear are selectively synchronized to the first center shaft by a second synchronizer.

5. The power transmission apparatus of claim 3, wherein:
    the first change gear train includes a gear ratio for a forward $2^{nd}$ speed and a forward 6th speed;
    the second change gear train includes a gear ratio for a forward 8th speed and reverse;
    the third change gear train includes a gear ratio for a forward 1st speed and a forward 7th speed; and
    the fourth change gear train includes a gear ratio for a forward 3rd speed and a forward 5th speed.

6. The power transmission apparatus of claim 1, wherein the composite transmission further comprises:
    the sun gear of the planetary gear set being fixedly connected with the power transmission shaft, the planetary carrier being selectively connected with the engine output shaft, and the ring gear being integrally formed with a center output gear on an external circumference, and the center output gear is externally gear connected between a center drive gear fixedly connected with the second center shaft and an output shaft input gear on the output shaft.

7. The power transmission apparatus of claim 6, wherein the composite transmission is configured to:

output torque selectively transmitted through the center drive gear of the second center shaft to the output shaft input gear on the output shaft through the center output gear of the ring gear and complementarily composite shift torque selectively input to the planetary carrier from the third input shaft and torque shifted from the fixed transmission and input to the sun gear through the power transmission shaft and output the torque to the output shaft input gear of the output shaft through the center output gear.

8. The power transmission apparatus of claim 6, wherein: the planetary gear set includes a single pinion planetary gear set.

9. The power transmission apparatus of claim 1, wherein: the power transmission shaft is selectively connected with a transmission housing through a brake.

10. The power transmission apparatus of claim 1, wherein:

the first center shaft is selectively connected with a transmission housing through a brake.

11. The power transmission apparatus of claim 9 wherein:

the first change gear train includes a gear ratio for a forward 2nd speed and a forward 6th speed;

the second change gear train includes a gear ratio for a forward 9th speed and reverse;

the third change gear train includes a gear ratio for a forward 1st speed and a forward 7th speed; and the fourth change gear train includes a gear ratio for a forward 3rd speed and a forward 5th speed.

12. The power transmission apparatus of claim 9, wherein:

the fixed transmission further includes a motor/generator for transmitting torque to the first center shaft.

13. The power transmission apparatus of claim 12, wherein the motor/generator further comprises a motor drive gear externally gear connected with an idle input gear of the idle shaft.

14. The power transmission apparatus of claim 9, further comprising:

a motor/generator selectively transmitting torque to the engine output shaft.

15. The power transmission apparatus of claim 14, wherein: the motor/generator is selectively connected with the engine output shaft through an engine clutch and with the first, second, and third input shafts through the first, second, and third clutches, respectively.

* * * * *